March 1, 1955

J. W. McREYNOLDS 2,702,981

SELF-CLEANING RAKE

Filed Dec. 2, 1953

INVENTOR
JOHN W. McREYNOLDS,
By Herbert A. Minturn,
ATTORNEY

March 1, 1955 — J. W. McREYNOLDS — 2,702,981
SELF-CLEANING RAKE
Filed Dec. 2, 1953 — 2 Sheets-Sheet 2
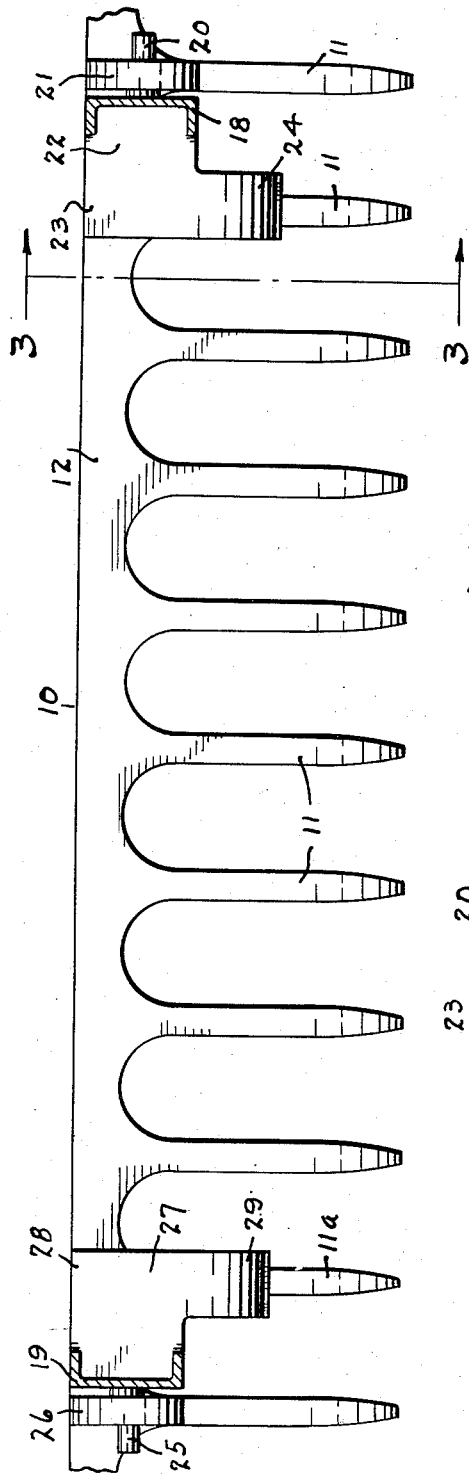
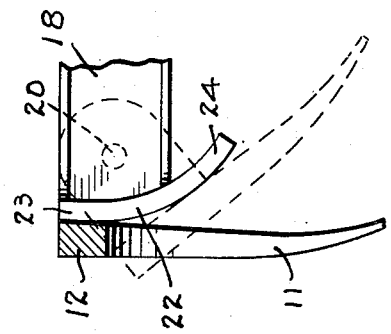
INVENTOR
JOHN W. McREYNOLDS,
By Herbert A. Neinturu,
ATTORNEY

United States Patent Office 2,702,981
Patented Mar. 1, 1955

2,702,981

SELF-CLEANING RAKE

John Wesley McReynolds, Kokomo, Ind.

Application December 2, 1953, Serial No. 395,668

1 Claim. (Cl. 56—400.2)

This invention relates to a rake such as would be used by hand in raking lawns and the like, and consists of a roke head rockably mounted on the end of handle members, the degree of rocking being limited to a raking position at one end of the rocking travel and to a cleaning position at the other end of the rocking travel.

The primary object of the invention is to provide an exceedingly simple construction which is entirely devoid of springs and adjustable mechanisms all to the end that the rake may be made in a very simple manner to be extremely durable and easily manipulated.

A further important advantage of the invention lies in the fact that the structure is quite rigid in the raking action, and automatically adjusts itself by a forward dragging movement of the rake to place the rake in a self cleaning position.

Furthermore, another advantage resides in the fact that the structure may be readily made in different forms either out of a cast iron member as the raking head, or out of a wire tooth construction embodied in a transverse head as is well known to those versed in the art, and further the handle connecting members may be made separately and detachable from the head for shipping and storage purposes all without requiring any degree of skill other than the manipulating of one or more bolts where the members interconnect with a handle.

These and many other objects and advantages of the invention will become apparent in the following description of one particular form of the invention as illustrated in the accompanying drawings, in which Fig. 1 is a view in top plan of a structure embodying the invention;

Fig. 2 is an enlarged view in section on the line 2—2 in Fig. 1; and

Fig. 3 is a transverse section on the line 3—3 in Fig. 2.

Figure 1:
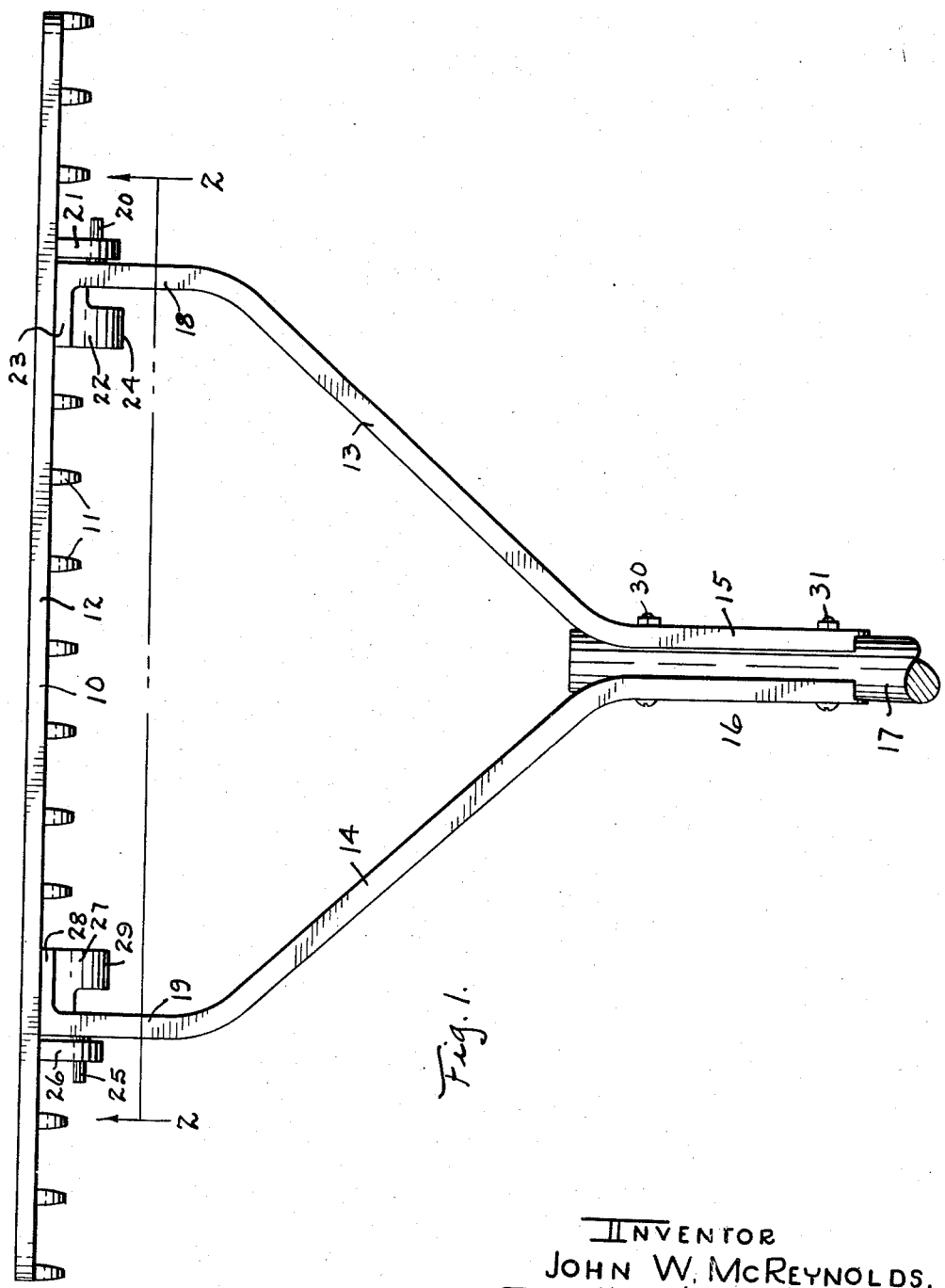

In the form of structure embodying the invention as herein illustrated and described, the rake 10 is shown as an integral member, that is the teeth 11 are integral with the transverse bar 12. The exact construction of the teeth and the bar 12 does not form a part of the invention per se.

A pair of handle members 13 and 14, the member 13 being a right hand member and the member 14 being a left hand member are formed to have ends 15 and 16 receive therebetween a handle 17. From these end portions 15 and 16, the members 13 and 14 respectively flare outwardly in opposite directions to terminate in forwardly extending end portions 18 and 19 approximately parallel one with the other.

On the forward end of the end portion 18, there is fixed a pin 20 to extend laterally therefrom and be received rockably in an ear 21 fixed to the bar 12. The member 18 also has a foot 22 extending at substantially right angles thereto forwardly of the pin 20, to extend from the member 18 along the head 12 a short distance as indicated in both Figs. 1 and 2. This foot 22 is so located in respect to the pin 20 that when the rake 10 is turned on the ear 21 with the pin 20 serving as a trunnion, the rake head 12 will abut the upper end portion of the foot 22, Figs. 2 and 3, to hold the rake 10 in substantially a right angle position to the member 18. The teeth 11 will be curved as may be desired for the required raking action.

The foot 22 extends from its upper portion 23 which is that part abutting the head 12, downwardly and rearwardly by the lower extension 24 which is carried back a sufficient distance to permit the rake 10 when it is revolved on the axis of the pin 20 to come into some such position as indicated by the dash lines. That is the rake 10 will be stopped against further rocking back under the member 18 by reason of its striking, herein shown as by a tooth 11, against this foot extension 24.

In like manner, the member 19 carries a pivot pin 25 rockably carried through an ear 26 extending rearwardly from the rake 10, primarily from the head 12, and there is a foot 27 extending from the member 19 along the head 12 to have its upper end portion 28 abut the head 12 at the same time the upper portion 23 of the foot 22 abuts the head 12. From the lower portion of the foot 28 there extends a part 29 herein shown as in the path of the tooth 11a to serve as a limiting stop against the rear travel of the tooth 11a, and consequently of the entire rake 10, this member 29 being a counterpart of the member 24. That is, both the members 24 and 29 simultaneously serve as stops against which the teeth 11 and 11a come into contact when the rake is pushed forwardly with the teeth on the ground.

With the teeth thus rocked rearwardly by forward pushing on the handle 17, the teeth are inclined as indicated by the dash lines in Fig. 3 such that, due to the curvature of the teeth, a portion of the teeth drag along the ground and thus bring the matter which may be entangled on the teeth into contact with the ground whereby the engagement with the ground will permit the teeth to be slipped out of such matter and thus have the teeth relieved and cleaned from such matter.

Then in the ordinary raking action, the rake is pulled rearwardly which automatically causes the teeth to come into the solid line positions as indicated in Figs. 1 and 3, so that the teeth 11 will then drag over the ground and perform the normal raking action. Due to the offset positioning of the pins 20 and 25 from the head 12, as indicated in Fig. 3, the rake 10 is freely rockable about the pins 20 and 25 between the raking position of the teeth 11 shown in solid lines in Fig. 3, and the cleaning position shown by the dash lines in the same figure. Since the members 15 and 16 received a handle 17 therethrough, they may be secured to the handle by any suitable means such as by the two bolts 30 and 31. By removing these bolts 30 and 31, the members 13 and 14 are thus free to be separated from the handle 17, and permit the pins 20 and 25 to be withdrawn from the ears 21 and 26 for disassembly. Thus it is to be seen that no springs or other adjustments or yielding members are required between the rake 10 and the handle members 13 and 14, since the degree of rocking is fixed by the formation of the feet 22 and 27 secured to the handle members.

Therefore while I have herein shown and described my invention in the one particular form, it is obvious that structural changes may be made therefrom without departing from the spirit of the invention, and I therefore do not desire to be limited to that precise form beyond the limitations which may be imposed by the following claim.

I claim:

A self-cleaning rake comprising a rake head having an upper transverse bar carrying downwardly extending teeth; a mounting ear extending rearwardly from the end portions of said bars; a pair of handle members; a pin entering each of said ears and the forward portions of said handle members; said pins locating said bar to lie across the forward ends of said handle members; a foot fixed to each of said handle members having an upper portion extending above said pins and against which upper portions said bar abuts when the rake head is pulled in a raking action; and said feet extending diagonally rearwardly and downwardly from their said upper portions below and under said pins forming abutments toward and against which said rake is rocked by pushing the rake head forwardly for cleaning.

References Cited in the file of this patent

UNITED STATES PATENTS

| 530,041 | Gifford | Nov. 27, 1894 |
| 767,420 | McLoughlin | Aug. 16, 1904 |
| 2,164,233 | Dubbs | June 27, 1939 |